United States Patent Office 2,772,298
Patented Nov. 27, 1956

2,772,298

11-OXYGENATED DERIVATIVES OF 13-METHYL-1,2,3,6,7,8,9,10,11,12,13,14,16,17 - TETRADECAHYDRO - 15H - CYCLOPENTA [a] PHENANTHRENE-3,17-DIONE

Leland J. Chinn, Morton Grove, Ill., assignor, by mesne assignments, to G. D. Searle & Co., Skokie, Ill., a corporation of Delaware No Drawing. Application June 11, 1953,
Serial No. 361,069

1 Claim. (Cl. 260—397.45)

The present invention relates to a new group of tetracyclic organic compounds and, more particularly, to 11-oxygenated derivatives of 13-methyl-1,2,3,6,7,8,9,10,11,-12,13,14,16,17 - tetradecahydro - 15H - cyclopenta[a]-phenanthrene-3,17-dione which can be represented by the structural formula

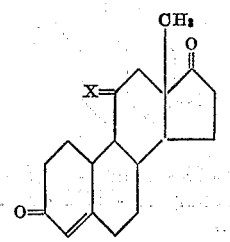

wherein X is an oxo or

radical.

A convenient starting material for these compounds is 3 - methoxy - 13 - methyl - 1,4,6,7,8,9,11,12,13,14,16,-17 - dodecahydro - 15H - cyclopenta[a]phenanthren - 17-one, described by Frank B. Colton in his copending application, Serial Number 286,611, filed May 7, 1952, issued as U. S. Patent No. 2,655,518. Treatment of this compound with dilute mineral acids yield 13-methyl-1,2,-3,6,7,8,9,10,11,12,13,14,16,17 - tetradecahydro - 15H - cyclopenta[a]phenanthrene - 3,17 - dione. 11 - hydroxylation is achieved by biochemical oxidation. 11α-hydroxylation is produced by fungi and bacteria. The more valuable 11β-hydroxy compound is obtained by perfusion through a surviving mammalian adrenal gland. 11β - hydroxy - 13 - methyl - 1,2,3,6,7,8,9,10,11,12,-13,14,16,17 - tetradecahydro - 15H - cyclopenta[a]phenanthrene-3,17-dione is a valuable hormonal agent. Unlike its 10-methyl derivative, it causes vaginal and uterine stimulation without interfering with adrenal corticoid balance or affecting the cardiovascular system. My invention also provides valuable intermediates in organic synthesis. Thus oxidation of the 11-hydroxy group with chromium trioxide yields the 13-methyl-1,2,3,6,7,8,9,10,-11,12,13,14,16,17 - tetradecahydro - 15H - cyclopenta-[a]phenanthrene-3,11,17-trione. Further valuable hormonal agents are obtained by the following series of reactions. Treatment of the 11-hydroxy-13-methyl-1,2,-3,6,7,8,9,10,11,12,13,14,16,17 - tetradecahydro - 15H - cyclopenta[a]phenanthrene-3,17-dione with ethyl orthoformate and p-toluenesulfonic acid yields 3-ethoxy-11-hydroxy - 13 - methyl - 1,2,7,8,9,10,11,12,13,14,16,17 - dodecahydro - 15H - cyclopenta[a]phenanthren - 17 - one

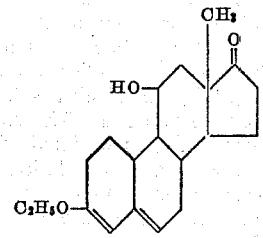

which, on hydrogenation with lithium aluminum hydride, yields the 3-ethoxy-13-methyl-1,2,7,8,9,10,11,12,13,14,16,-17 - dodecahydro - 15H - cyclopenta[a]phenanthrene - 11,17-diol of the structural formula

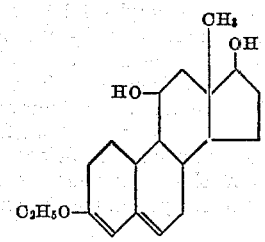

Cleavage of this ether with dilute mineral acid, e. g. with 5% hydrochloric acid in methanol, causes formation of 3 - oxo - 1,2,3,6,7,8,9,10,11,12,13,14,16,17 - tetradecahydro-15H-cyclopenta[a]phenanthrene-11,17-diol

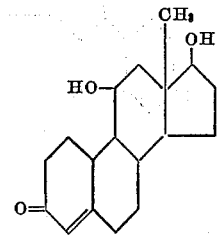

the 11β-hydroxy isomer of which has valuable adrenocorticoid properties.

The compounds which constitute my invention and the methods for preparing them appear more fully from the examples below. However, the invention is not to be construed as limited by the details set forth in spirit or in scope. It will be obvious to those skilled in the art that many modifications in materials and methods can be practiced without departing from the invention. In these examples temperatures are given in degrees centigrade (°C.) and relative amounts of materials in parts by weight.

*Example 1*

A mixture of 192 parts of 3-methoxy-13-methyl-1,4,6,-7,8,9,11,12,13,14,16,17 - dodecahydro - 15H - cyclopenta-[a]phenanthren-17-one and 1000 parts of 5% aqueous hydrochloric acid solution is heated for 8 minutes under nitrogen to 70° C. and then cooled. The oily layer is separated, triturated with water and washed successively with 5% sodium bicarbonate solution and water. The resulting 13 - methyl - 1,2,3,6,7,8,9,10,11,12,13,14,16,17 - tetradecahydro - 15H - cyclopenta[a]phenanthrene - 3,-17-dione is recrystallized from a mixture of ether and petroleum ether. Colorless plates are thus obtained which melt at about 168–170° C.

*Example 2*

In the course of 3 hours a stirred mixture of 1 part of 13 - methyl - 1,2,3,6,7,8,9,10,11,12,13,14,16,17 - tetradecahydro - 15H - cyclopenta[a]phenanthrene - 3,17 - dione, 5000 parts of citrated beef blood and 5000 parts of 0.85% aqueous sodium chloride solution is perfused twice through a surviving beef adrenal, cannulated through the vein and having a finely lacerated surface. The perfusate is frozen, thawed and extracted with isopropyl acetate. This extract is washed with water, dried by azeotropic distillation, concentrated to a residue of about 20 parts and then diluted with an equal volume of benzene. The mixture is applied to a chromatography column containing 95 parts of silica gel. The column is washed with 200 parts of a 10% solution of ethyl acetate in benzene. It is then eluted with 100 parts of a 25% and 50 parts of a 33% solution of ethyl acetate in benzene; concentration of these eluates yields unconverted starting material. The column is next eluted with 50 parts of a 33% and 50 parts of a 50% solution of ethyl acetate in benzene. Then the column is eluted with 150 parts of a 50% solution of ethyl acetate in benzene and the eluate is concentrated under vacuum. Two crystallizations of the residue from ethyl acetate yield 11β - hydroxy - 13 - methyl - 1,2,3,6,7,8,9,10,11,12,13,-14,16,17 - tetradecahydro - 15H - cyclopenta[a]phenanthrene-3,-17-dione, melting at about 194–196° C. The molecular rotation, as determined in a 1% chloroform solution, is $[\alpha]_D^{20} = +152°$. The ultraviolet absorption spectrum shows a maximum at about 242 millimicrons with a molecular extinction coefficient of 17,400. The infrared spectrum shows maxima at 2.76, 5.78 and 6.03 microns. The compound has the structural formula

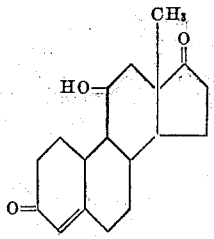

Example 3

To a solution of 8 parts of 11β-hydroxy-13-methyl-1,2,3,6,7,8,9,10,11,12,13,14,16,17 - tetradecahydro - 15H - cyclopenta[a]phenanthrene-3,17-dione in 400 parts of glacial acetic acid, a solution of 13 parts of chromium trioxide in 400 parts of water is added. The solution is maintained at 6–8° C. with occasional agitation. After addition of 80 parts of ethanol to decompose the excess oxidizing agent, the solution is poured into water and extracted with chloroform. This extract is washed successively with water, 5% sodium hydroxide solution and water. It is then dried over anhydrous sodium sulfate and evaporated. Trituration of the residue with dry ether causes crystallization. Recrystallized from methanol the 13-methyl-1,2,3,6,7,8,9,10,11,12,13,14,16,17-tetradecahydro - 15H - cyclopenta[a]phenanthrene - 3,11,17 - trione is obtained in the form of heavy plates which melt at about 212–215° C. Infrared maxima are observed at 5.74, 5.84 and 6.02 microns. The compound has the structural formula

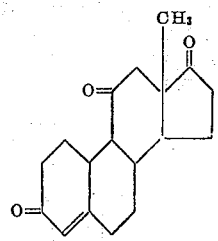

I claim:

11β - hydroxy - 13 - methyl - 1,2,3,6,7,8,9,10,11,12,13,-14,16,17 - tetradecahydro - 15H - cyclopenta[a]phenanthrene-3,17-dione.

References Cited in the file of this patent
UNITED STATES PATENTS

| | | |
|---|---|---|
| 2,602,769 | Murray et al. | July 8, 1952 |
| 2,686,792 | Murray et al. | Aug. 17, 1954 |